Sept. 4, 1945.  D. S. WOLFORD ET AL  2,384,411
DEVICE FOR TESTING THE COMPRESSION CHARACTERISTICS OF SHEET METALS
Filed May 6, 1943

Inventors
Don S. Wolford
Harry La Tour
By Allen & Allen
Attorneys

Patented Sept. 4, 1945

2,384,411

UNITED STATES PATENT OFFICE 2,384,411

DEVICE FOR TESTING THE COMPRESSION CHARACTERISTICS OF SHEET METALS

Don S. Wolford and Harry La Tour, Middletown, Ohio, assignors to The American Rolling Mill Company, Middletown, Ohio, a corporation of Ohio Application May 6, 1943, Serial No. 485,860

9 Claims. (Cl. 73—94)

With the increasing use of high-strength, light-gauge sheet metal in various constructions, more adequate means for testing the physical characteristics of such materials are needed. In the past, it has been customary to design structural shapes of sheet metal on the basis of the tensile strength tests. It is, however, now generally recognized that tensile tests are not alone adequate for the purpose, for the reason that such structures almost invariably fail in compression rather than in tension. While insufficient data exists to make it proper to say that the compression characteristics of sheet metal bear no necessary relationship to their tensile characteristics, it is proper to say that tensile strength tests on high-strength, light-gauge sheet metal are not reliable guides to the behavior of the same materials under compression.

The compression testing of sheet metals has largely been neglected until recently, though some compression methods have been developed. All of these methods possess inherent disadvantages, whereas the increasing use of thin sheet materials in aircraft and other fields of manufacture is making imperative the development of mechanism and procedure whereby the compression properties of these materials can be determined quickly and inexpensively.

The pack method, which has been proposed by the National Bureau of Standards, tends to be costly and time-consuming, since it involves the necessity of lining up the test piece with a relatively large number of other pieces of different dimension in forming a pack for test purposes, and bracing it laterally by a large number of individually adjusted supporting rods.

Franks and Binder have proposed a cylinder method, but this again involves difficulties and uncertainty because an unknown amount of strain is likely to be introduced into the test material in the forming or rolling operation by which it is curved into a cylinder. Unknown factors are also likely to be introduced in any seam formed in the cylinder. Moreover, time and skill are required to prepare the sample.

Montgomery and Templin have devised a single strip test wherein the strip is supported in a jig or the like by means of tiny roller bearings at each side of it. These bearings are set on 0.1 inch centers across the sample along almost the entire length of it. It will be understood that this requires an elaborate jig for supporting the rollers and considerable time for assembly. Moreover, it has certain physical limitations. The spacing of the rollers limits the minimum gauge of material that can be tested. It will be understood that the support afforded by the rollers is limited to parallel spaced lines so that, in general with rollers on 0.1 in. centers, the minimum thickness of material which can be tested is limited to approximately 0.20 in. If thinner sheet material is tested, its tendency is to buckle rather than to compress. In the apparatus employed the length of the sample with respect to the length of the jig has been such as to provide a clearance of only .05 in. at one end, i. e., above the top of the jig, there being no clearance at the other end of the jig. This limits the maximum strain which can be imposed on the sample to such an extent that frequently sufficient data cannot be obtained on high-strength materials. It has also been noted that the rollers themselves tend to indent the sample to such an extent that some uncertainty is introduced.

It is a general object of our invention to obviate the difficulties which have just been mentioned. It is our object to provide a structure which will accept an individual sample and hold it in such a way that a true compression test may be made on it. It is our object to accomplish this without the necessity of accurate or elaborate adjustment, and also without the necessity of complicated or elaborate apparatus.

It is an object of our invention to provide a holder for a compression test sample in which it is made of flat bearing bodies as hereinafter described, and in which supporting means is provided for the holder in such fashion as to facilitate the insertion and clamping of the sample with proper and accurate clearance, which clearance occurs at both ends of the holder, and is sufficient for the complete testing of high-strength materials.

It is an object of our invention to provide a device which can be used with the standard compressometer, such as is set forth in Bulletin of the Baldwin-Southwark Company and shown in Figure 32 of that bulletin.

It is an object of our invention to provide a device which has an absolute minimum of parts and can be used by inexperienced operators, making very rapid but none-the-less accurate compression tests.

These and other objects of our invention, which will be set forth hereinafter or will be apparent to one skilled in the art upon reading these specifications, we accomplish by that certain construction and arrangement of parts of which we shall now describe an exemplary embodiment. Refence is made to the accompanying drawing in which.

Figure 1:
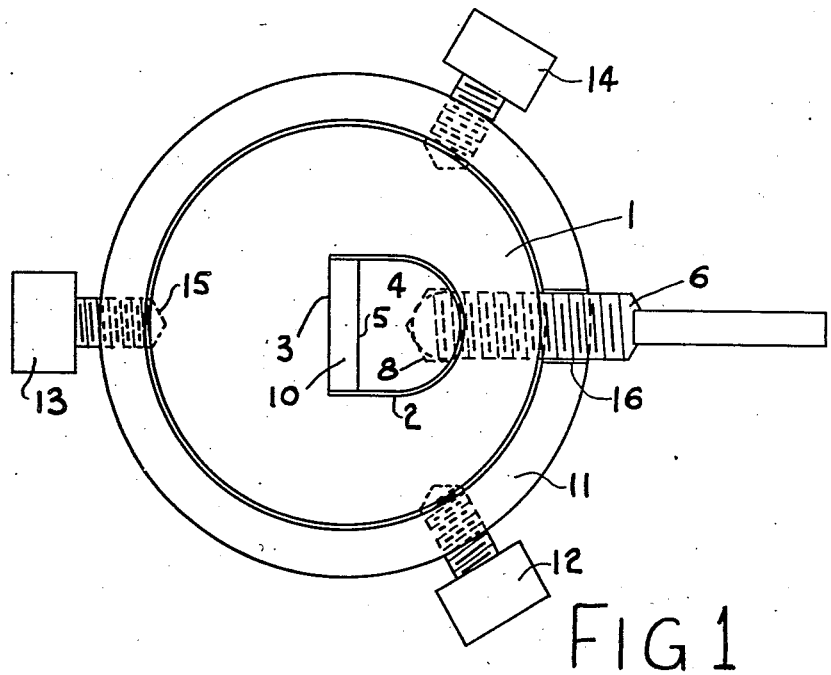
Figure 1 is a plan view of our jig and a positioning device therefor.

While there is no limitation on the physical dimensions of our device, as will be apparent hereinafter, in its exemplary embodiment, it is designed to accept a sample which is 2 in. long and ½ in. wide and, of course of variable thickness as determined by the gauge of the sheets from which the samples are cut. This gives us a test specimen which is comparable to the standard sheet tensile test specimen used in accordance with the known A. S. T. M. standard.

We have found that compression tests may be made upon a sample simply clamped between flat surfaces conforming to its sides and with the specimen projecting at one or both ends of the jig which presents those flat surfaces. Former workers have apparently proceeded on the assumption that it was necessary to relieve friction at the sides of the sample either by providing no support at all as in the cylinder method, or by providing anti-frictional roller supports as in the Montgomery and Templin method, or by more or less elastically supporting the test sample in the midst of a pack of similar pieces which will be compressed along with the sample and distorted to the same extent. We have found that this is not the case; but on the contrary, it is possible to support the sample between hard, non-yielding supporting surfaces sufficiently to prevent bending without encountering any frictional difficulties. Test results obtained by our procedure are equivalent to test results otherwise obtained and quite as accurate. Whether an increase in thickness of the test piece occurs during compression and to what extent has not been ascertained by us; but such an increase of thickness if it occurs does not affect the accuracy of our results. It is our general practice to coat either the side faces of the sample or the clamping faces of the jig with a high-pressure grease as a precautionary measure, but results appear to show that this is not necessary.

Our jig may be made in a variety of modifications, and in particular it is not necessary that the jig body be machined or formed from a unitary piece of metal. It can be made from parts bolted or otherwise fastened together. The members presenting the flat clamping surfaces may both be made movable and adjustable if desired.

Our jig, in its preferred embodiment, comprises a cylindrical or other shaped body 1, preferably of tool steel or its equivalent. It is accurate as to length so that when a test piece is placed in a bore formed within it, the test piece will project at one or both ends by the desired amount of clearance. We prefer a projection at both ends because this gives a greater combined or total clearance, and permits the obtaining of complete data on high-strength materials where a clearance at one end may not be sufficient for the purpose. For 2 in. samples of ordinary sheet gauges throughout a wide range, a projection of the sample .050 in. at each end of the jig is sufficient for testing purposes without giving rise to danger of bending over of the projecting sample ends. It will be understood by the skilled worker that, depending somewhat on the material being tested, the gauge of the sample will roughly determine how far it may project; but, as indicated, a projection of .050 in. at each end of the jig is feasible for the usual sheet gauges employed for constructional purposes.

A bore 2 is formed through the body 1 from end to end. For a sample having a ½ in. width, the bore may initially be formed with a $^{33}/_{64}$ drill. One side of the bore is flattened, as at 3, to conform to the face of the sample. The width of the flattened portion is the same as the width of the drilled hole, namely, .525 in. thus providing adequate clearance for edgewise spreading of the sample during the test. For the sake of balance, the flat face 3 is preferably so located that for the average thickness of sample, the sample will be located in the jig with its center plane substantially coinciding with an axial plane of the jig.

Figure 2:
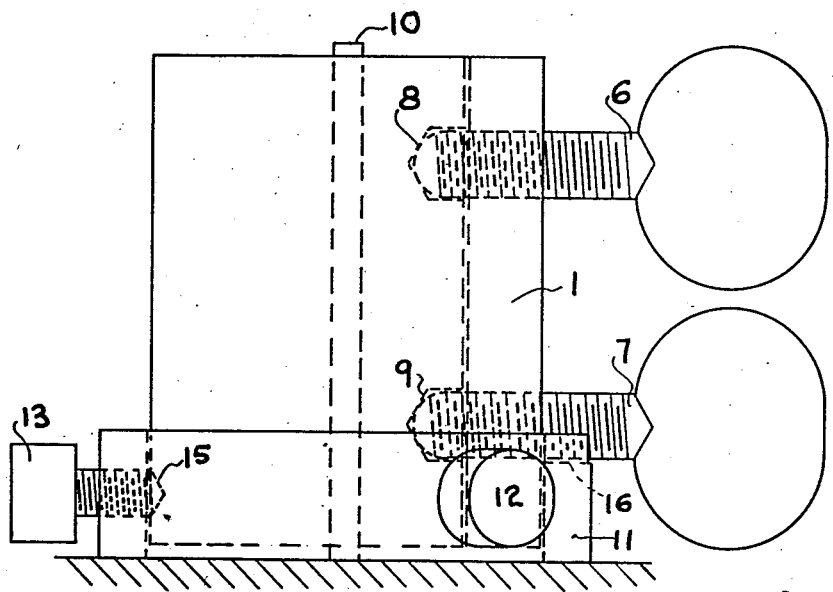
Figure 2 is an elevational view of the same elements.

Within the bore, we place a clamping member 4 in the form, preferably, of a half-round piece of tool steel having a flat face 5 to contact the opposite face of the sample. For the exertion of clamping pressure, we provide a pair of set screws, 6 and 7, threaded into lateral bores in the body 1. The ends of the set screws are preferably rounded as shown in Figure 2, and recesses 8 and 9 are preferably drilled into the arcuate face of the clamping member 4, so that the set screws may serve to retain the clamping member 4 within the bore during the insertion and removal of samples, but before any clamping pressure has been exerted. A sample is indicated in the figures at 10.

Since it is desired to have the sample 10 project at both ends of the jig, and since if this is done, the jig will not rest flatly upon the bed or platen of the press in which the compression test is to be conducted, we provide a jig holder which in its operation not only serves to hold the jig upright during loading and unloading, but also facilitates the proper insertion of the sample in the jig.

This means comprises a ring 11, somewhat larger in internal diameter or shape than the body 1. The ring 11 is provided with set screws 12, 13 and 14, threaded into lateral projections in the ring, and engaging recesses, as at 15 in the body 1. Both the set screws and the recesses are preferably tapered for accurate location, and are so positioned that when the ring is held to the body 1 by the set screws, it will support the body above a surface upon which the ring rests by the distance of .050 in. in the exemplary embodiment. With the set screws 6 and 7 in the released position, then, the sample 10 may be inserted between the faces 3 and 5 of the clamping members and passed downwardly until it rests against the supporting surface. Its lower clearance will then be .050 in. and, assuming the sample to be accurate in length, its upper clearance will be the same.

The surface upon which the ring and jig rest will usually be the platen of the press, but it may be some other flat surface. With the sample in position, the set screws 6 and 7 are tightened. This is merely done by hand. The clamping pressure should be substantially uniform, i. e., one of the set screws should not deliberately be tightened tighter than the other; but the degree of pressure is not important as respects the accuracy of the test. It is not desired to clamp the sample under any very great pressure, and a tightening with the fingers is sufficient.

If the positioning of the sample has not been accomplished while the jig and ring are positioned on the platen of the press, they are next transferred to the press, and the ram is brought down gently against the upper projecting end of the sample. It is desired at this point merely to clamp the sample endwise between the press platens with sufficient force to maintain the upright position of the jig. When this is accomplished, the set screws 12, 13 and 14 are loosened so that the jig is freed from the ring 11 which, thereafter, performs no function during the test. During the test, any movement of the jig body 1 produced by endwise compression of the sample will thus produce a movement of the jig body relative to the ring 11 from which it is now free. Where the thickness of the ring is such as to bring it into the plane of the lower set screw 7, it is relieved, as at 16, to permit such sliding movement.

The nature of the compression test itself is known and need not be detailed here. We have already indicated a type of compressometer preferred for rapid testing; but it will be understood that other types may be used. For example, the Huggenberger extensometer can be attached to the edges of the test sample. To permit this, windows are provided in the body of the jig so that the edges of the sample are exposed for suitable contact with the measuring points of the extensometer.

While we have indicated the body 1 as a cylindrical body, and while it is most conveniently formed in this way, it may have other configurations, as will be evident. It enters into the testing procedure merely as a means for positioning the test sample in the test position, and for maintaining it against flexing or bending during the compression step which forms a part of the test.

Modifications may be made in our invention without departing from the spirit of it. Having thus described our invention, what we claim as new and desire to secure by Letters Patent is:

1. A jig for a sample to be subjected to compression tests, said jig comprising a metal body having a hollow therein with means to present a flat longitudinal face, a metal part located in said hollow and having a matching flat face, means for urging the metal part under pressure toward the first mentioned flat face so that a test sample can be engaged and clamped between the flat faces, the length of the body being so proportioned to a given length of test sample as to provide for the extension of the sample through the said body and the projection therefrom at both ends, and means to support said body above a flat surface such as the platen of a press with said flat faces normal thereto, and with said body so spaced from said surface as to gauge the projection of said sample from said body.

2. A jig for a sample to be subjected to compression tests, said jig comprising a metal body having a hollow therein with means to present a flat longitudinal face, a second metal part located in said hollow and having a matching flat face, and means for urging the second member under pressure toward the first mentioned flat face so that a test sample can be engaged and clamped between the flat faces, the length of the body being so proportioned to a given length of test sample as to provide for the extension of the sample through the said body and the projection therefrom at both ends, in combination with a detachable support comprising a portion to embrace an end of said body and means on said portion to engage said body and hold it at a fixed distance above a surface on which said support rests so that said support in coaction with a surface on which it rests may determine the downward projection of a test sample below said first mentioned body.

3. A jig for making compression tests, having a body with a longitudinal bore, said bore having a flattened face, a metal piece of substantially the same length as said body and also having a flattened face, located in said bore, set screws threaded into lateral perforations in said body and engaging said metal piece so that a test sample may be clamped between said flat faces so as to lie substantially along the axis of said body, said body having a length apportioned to a given length of test sample so that the said sample can extend through said body and project therebeyond at both ends, in combination with releasable means for supporting said jig a distance above a flat surface sufficient to gauge the projection of said sample equally at both ends whereby a sample may be engaged in said jig, the ends of said sample engaged by the platens of a press, and the releasable means released, leaving the sample supporting the jig.

4. The structure of claim 1, wherein said supporting means, comprises an embracing member with an opening larger than said body, set screws threaded laterally through said member, depressions on said body in which the ends of said set screws may engage so that said member can support said body above a flat surface upon which said member rests a distance equal to the desired downward projection of said test sample from said body.

5. The structure claimed in claim 3 wherein said body is 1.9 in. in length, and wherein said releasable means is capable of supporting said body accurately .05 in. above a flat surface on which said releasable means rests.

6. The structure claimed in claim 3 wherein said body is 1.9 in. in length, and wherein said releasable means is capable of supporting said body accurately .05 in. above a flat surface on which said releasable means rests, the width of the flat face of said bore in said cylindrical body being approximately .525 in., and the width of the flat face on said metal piece being approximately .50 in., the said jig accepting a 2 in. test sample with a projection of .05 at each end of the jig.

7. In combination for the purpose described, clamping means for a flat elongated compression test sample, said clamping means comprising a body and a movable clamping element both having flat faces for engaging said sample, and means for causing said body and element to exert clamping pressure sidewise on said sample, and a removable fixture for holding said clamping means a fixed distance above a flat surface so that a test sample may be positioned in said clamping means accurately with a predetermined projection at each end thereof.

8. A process of performing compression tests upon elongated test samples of sheet material which comprises providing a jig having flat clamping faces and pressure exerting means, providing a sample of sufficient length to extend through said jig and project at both ends by a distance substantially equivalent to .05 in. in 2.0 in. overall length, positioning and clamping said sample in said jig with the same projection at each end, and subjecting the sample to compression while clamped in said jig under circumstances in which the sample itself, by engaging the opposed platens of a press, supports the jig between said platens.

9. A process of performing compression tests upon elongated samples of sheet material which comprises providing a jig having flat clamping faces and pressure exerting means, providing a sample of sufficient length to extend through said jig and project at both ends a distance insufficient to permit bending under compressive forces applied in the direction of the length of the sample, positioning and clamping said sample in said jig with the sample projecting at each end, placing and holding the jig between the platens of a press in such a way as to cause the sample to extend normal to said platens, bringing said platens into engagement with the ends of said sample, then permitting the jig to be supported between the platens solely by means of the sample, and thereafter applying further compressive force to the sample by means of the platens.

DON S. WOLFORD.
HARRY LA TOUR.